Figures 1, 2:
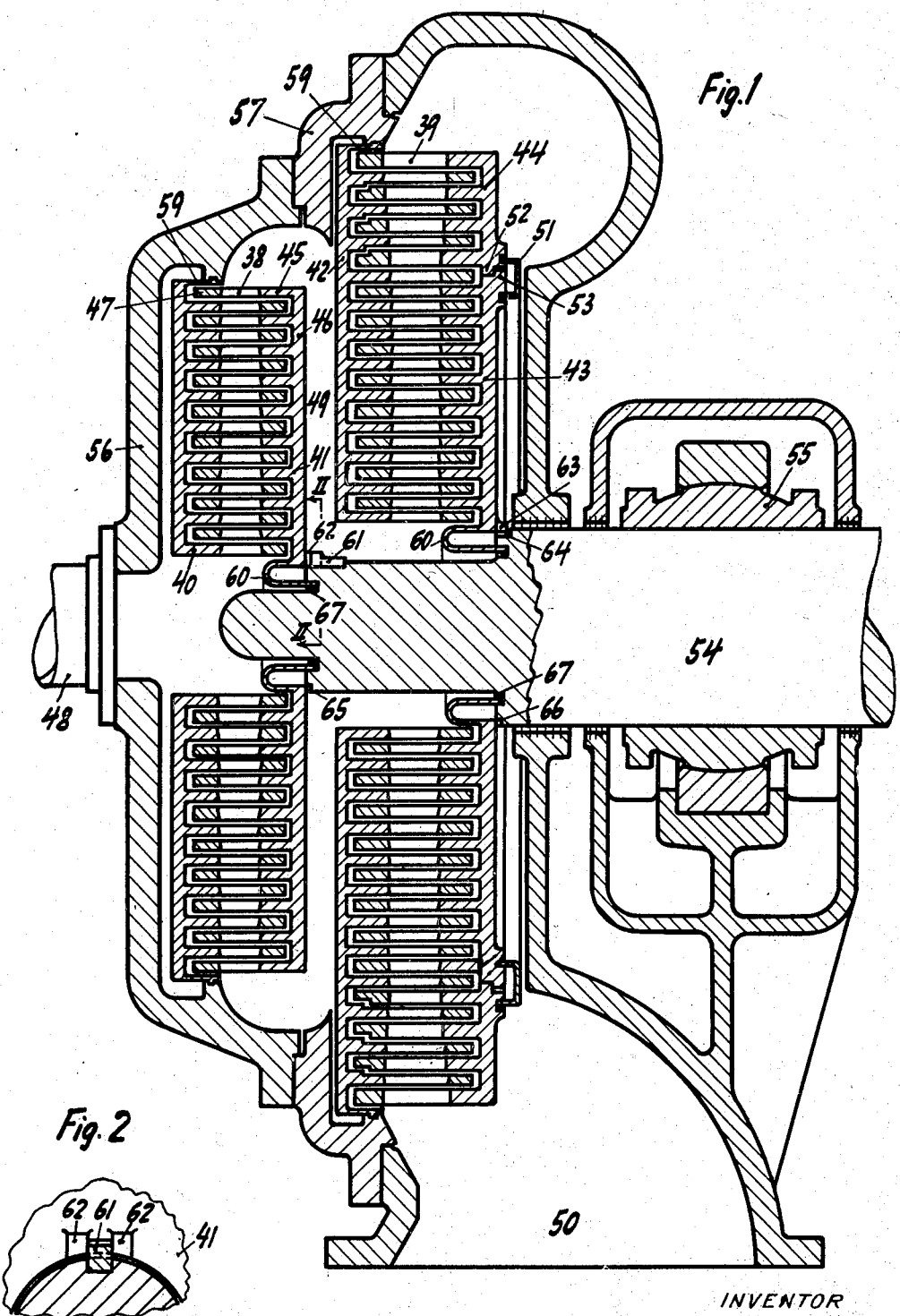

April 26, 1938.  U. MEININGHAUS  2,115,031

DISK CONSTRUCTION FOR RADIAL FLOW MACHINES

Original Filed March 22, 1932

INVENTOR
U. MEININGHAUS
BY
ATTORNEY

Patented Apr. 26, 1938

2,115,031

UNITED STATES PATENT OFFICE 2,115,031

DISK CONSTRUCTION FOR RADIAL FLOW MACHINES

Ulrich Meininghaus, Muelheim-Ruhr, Germany

Original application March 22, 1932, Serial No. 600,500. Divided and this application June 8, 1935, Serial No. 25,676. In Germany February 16, 1932

13 Claims. (Cl. 253—87)

My invention relates to the construction of disks for use in machines wherein they are exposed to the action of a heated pressure medium and are subjected to axial thrust and torque, as in a radial flow turbine where they support the turbine blades. Disks of this kind have been claimed in my copending application Ser. No. 600,500, filed March 22, 1932, and this application is a division of such earlier application.

As already described in my copending application Ser. No. 600,500, disks carrying blades of radial flow machines are conveniently supported by elastic annular members in order to allow the disks to expand or contract freely with any change in the state of heat of the working medium. If the disks are built up of a great number of rings or of rings of large diameter a considerable deformation of the elastic annular members supporting them arises from the expansion or contraction due to temperature changes or—in the case of rotating disks—from the expansion due to centrifugal force. In order to keep the stresses hereby arising in the elastic annular elements within permissible limits, the supporting elastic annular elements must be constructed with comparatively thin walls. The thin walled elastic annular elements are not able to withstand high additional stresses such as arise from the torques and thrusts which occur with blade carriers in radial flow machines.

It is the object of my present invention to relieve the thin walled elastic annular elements which support the bladed disks from such additional stresses, and I propose to provide means for transferring the torque or thrust directly from the disks to the machine part supporting the disks and operating to relieve the thin walled elastic annular elements of the transfer of the torque or thrust, said means engaging with radially extended surfaces of the disks and allowing free movement of the disks in a radial direction.

On the accompanying drawing, which shows by way of example a satisfactory embodiment of the invention, Fig. 1 shows a section through a radial flow turbine embodying the invention; and Fig. 2 is a section along the line II—II of Fig. 1.

In the turbine shown in Fig. 1, the blades or rows of blades 38 and 39 are supported by disks 40, 41, 42, 43, and 44, such disks being constructed acocrding to my copending application Ser. No. 600,500. The structural elements of the disk 41, for instance, are the root rings 45 which support one end of the blades 38. Said elements are linked to each other by elastic joints 46. The other ends of the blades 38 are supported by the head rings 47. Steam enters through the inlet pipe 48, flows in an outward direction through the rows of blades 38 where it gives off part of its work, streams back through the conduit 49 towards the shaft, and impinges now the row of blades 39 again in radial direction giving off the remainder of its work and leaving the turbine at 50. As it does work the steam expands and gradually drops in pressure. A pressure difference between the two sides of the above mentioned disks consequently arises creating an axial thrust. At the same time a torque is created in the blade rows by the action of the steam, the sum of the torques of the blade rows being transmitted to the disks.

The elastic joints of the disks connecting the root rings are arranged at one end of said root rings; this arrangement has the advantage that the steam flows through the blades in an outward direction only, the area of flow increasing with the diameters of the rings in accordance with the expansion of the steam. To relieve the bending stresses caused by the centrifugal force resulting from the unbalanced arrangement and also the radial stresses caused by differential expansion the disks 43 and 44 have been separated and linked by the elastic annular element 51. This thin walled elastic annular element is relieved of the thrust by the shoulders 52 and 53. The disks 41, 43, and 44 rotate and are fastened to the shaft 54 which is supported by the bearing 55; the disks 40 and 42 are stationary and supported by the housings 56 and 57; the latter being screwed to the housing 58. The disks are capable of withstanding the axial thrust and of following all temperature changes of the steam. To this effect, the stationary disks 40 and 42 are connected to the housings by thin walled, elastic annular members 59 and the rotating disks 41 and 43 in a similar manner by the thin walled, elastic annular members 60 to the shaft 54. The members 60, as shown, are of U-shape, being connected at one edge integrally with the disks and at the other edge to the shaft, the intermediate portion lying inwardly of the respected disks. To obtain sufficient flexibility the walls of the elastic annular members are so thin that for instance the annular members 60 of the rotating disks are not strong enough to transfer the great circumferential force due to the torque when their diameter is small, as the circumferential force increases with decrease of the diameter. To relieve the thin walled elastic annular member 60 from the torque a key 61 is provided at the shaft which fits with its surfaces extending in radial direction in a slot on a shoulder 62 of the disk 41 (see Fig. 2). In this way the torque is transferred directly from the disk 41 to the shaft 54 thereby relieving the thin walled elastic annular member 60 from the torque without interfering with the free expansion or contraction of the disk 41 in radial direction. The torque of the disk 43 is transferred in a similar way by the surfaces of the projection 63 of the disk extending in radial direction and fitting in a slot 64 on the shaft.

The thin walled elastic annular elements 60 are also relieved of the thrust for the same reason. The disks 41 and 43 rest with the surfaces 65 and 66 which extend also in radial direction against corresponding shoulders on the shaft. Also these surfaces do not interfere with the free radial expansion or contraction of the disks. The thin walled elastic annular elements 60 which are integral with the rotating disks are fastened to the shaft 54 by caulking the free end into a notch by means of caulking wire as shown at 67; this way of fastening insures a joint which may always easily be separated and again renewed in spite of the fact that the joint is subjected to the action of the hot steam. Besides, the joint takes very little space in radial and axial direction. This latter feature is of great importance if a rather large number of disks is to be employed, as the joints increase in diameter to allow for assembling the integral disks endwise on the shaft, and an additional length of joint will occur with each disk, thus resulting in an excessive additional length. On the other hand, a large number of disks is desirable because it produces increased efficiency and diminishes of the rather high axial thrusts which occur in radial flow machines, as described in my copending application Ser. No. 671,442.

The thin walled, elastic annular element 60 has a tendency to heat up and cool off faster than the heavy machine part to which the element is connected by caulking (shaft 54). The differential expansion or contraction caused in this way will bring the surfaces 65 and 66 out of contact with the shaft or press them against the shaft, thus imposing an axial thrust on the thin walled, elastic member 60. In order to render harmless the temporary over expansions or contractions of the annular members 60 the point of connection of said annular member 60 to the shaft 54 is arranged in substantially the same radial plane as the radially extending surfaces 65 or 66 for transferring the thrust. The annular member 60 can now expand or contract without changing the axial position of the surfaces 65 or 66.

I claim:

1. The combination with a rotary disk having axially extending, radially impinged turbine blades thereon, said disk being subjected in use to the different pressures of the driving medium at the opposite sides thereof and to a resultant thrust in one direction, of a rotating machine part supporting said disk, radially extending surfaces on said disk and said machine part engageable with each other in the axial direction, and an elastic annular member tightly connected along one edge to said disk and along the other edge to said machine part to prevent leakage of the driving medium from one side of said disk to the other, the line of connection of said elastic annular member with said machine part being arranged in substantially the same radial plane with said radially extending surfaces to enable said radially extending surfaces to cooperate with each other, apart from said elastic member, to substantially relieve said elastic annular member of the transfer of the thrust from said pressure loaded disk to said machine part.

2. The combination as set forth in claim 1, wherein both lines of connection of the elastic annular member with the disk and with the machine part are arranged in substantially the same radial plane with said radially extending surfaces.

3. The combination with a rotary disk having axially extending, radially impinged blades thereon, said disk being subjected in use to the different pressures of the driving medium at the opposite sides thereof and to a resultant thrust in one direction, of a rotating shaft supporting said disk and provided with a shoulder, the inner diameter of said disk being smaller than the outer diameter of said shoulder, the surface of the disk at the low pressure side of the disk being arranged to bear against the shoulder in the loaded condition of the disk to transfer the thrust on the disk to the shaft by way of such shoulder, the blades on said disk overlying the reduced portion of the shaft adjacent to the shoulder, and an elastic annular member untensioned in the stationary condition of the disk and attached to the disk and to the shaft, said annular member providing a seal between the disk and shaft.

4. The combination as set forth in claim 1, wherein the annular member is integral with the disk.

5. The combination as set forth in claim 1, wherein the annular member is of U-cross-section.

6. The combination as set forth in claim 1, wherein the radially extending surfaces are located at approximately the diameter of the annular member.

7. The combination as set forth in claim 3, wherein the annular member is of U-shape and is directly connected to the disk and to the shoulder in approximately the same radial plane.

8. The combination with a rotary disk having axially extending, radially impinged turbine blades thereon, said disk being subjected in use to the different pressures of the driving medium at the opposite sides thereof and to a resultant thrust in one direction, of a rotary shaft supporting said disk and having a shoulder thereon, and an elastic annular member connected to said disk and directly connected to said shoulder, said disk and shoulder having opposing surfaces extending in an approximately radial direction and directly engageable with each other in the axial direction, said surfaces being disposed at approximately the same diameter as said elastic annular member and cooperating with each other, apart from said elastic annular member, to substantially relieve said member of the transfer of the thrust from the disk to the shaft.

9. The combination with a rotary disk having axially extending, radially impinged turbine blades thereon, said disk being subjected in use to the different pressures of the driving medium at the opposite sides thereof and to a resultant thrust in one direction, of a shaft for supporting said disk, said shaft having a portion of reduced diameter to provide a shoulder thereon, and an elastic annular member for suspending the disk above the reduced portion of the shaft, said member being connected along one edge to the disk and along the other edge to the shaft and having an intermediate curved portion spaced from the reduced portion of the shaft, the connection between said member and the shaft being accessible through such space for disconnecting the disk, with the annular member attached thereto, from the shaft, said disk engaging said shoulder in the axial direction to transmit the axial thrust to the shaft and thereby relieve the annular member of the transfer of said thrust.

10. The combination as set forth in claim 9, wherein the annular member is of U-cross-section and is connected by caulking to the shoulder, said member being spaced a sufficient distance from the reduced portion of the shaft for the insertion of a caulking tool therebetween.

11. The combination set forth in claim 9, including means on the disk and shoulder intergaging in a circumferential direction for transferring the torque to the shaft.

12. The combination with a rotary disk having axially extending, radially impinged turbine blades thereon, said disk being subjected in use to the different pressures of the driving medium at the opposite sides thereof and to a resultant thrust in one direction, of a shaft for supporting said disk, an elastic annular member of curvilinear cross-section extending laterally of the approximately radial central web of the disk in the direction of the blades and connected along one edge to said web, the other edge of said member being connected to the shaft, means on said shaft presenting an approximately radially extending surface against which said web bears to transfer the thrust on the disk to the shaft, and means on said shaft and web presenting opposed surfaces engaging in the circumferential direction for transferring the torque from the disk to the shaft.

13. The combination as set forth in claim 12 wherein the last-mentioned means is positioned upon the side of the web opposite that of the blades.

ULRICH MEININGHAUS.